United States Patent [19]

O'Brien, Jr. et al.

[11] Patent Number: 5,675,553
[45] Date of Patent: Oct. 7, 1997

[54] METHOD FOR DATA GAP COMPENSATION

[75] Inventors: Francis J. O'Brien, Jr., Newport; Chung T. Nguyen, Bristol; Sherry E. Hammel, Little Compton; Bruce J. Bates, Portsmouth; Steven C. Nardone, Narragansett, all of R.I.

[73] Assignee: The United States of America as represented by the Secretary of the Navy, Washington, D.C.

[21] Appl. No.: 682,895

[22] Filed: Jun. 28, 1996

[51] Int. Cl.$^6$ .................................................. G01S 15/00
[52] U.S. Cl. ........................... 367/135; 367/136; 367/124
[58] Field of Search ................................. 367/136, 135, 367/134, 124; 364/517, 574, 577

[56] References Cited

U.S. PATENT DOCUMENTS

| | | | |
|---|---|---|---|
| 5,357,484 | 10/1994 | Bates et al. | 367/118 |
| 5,373,456 | 12/1994 | Ferkinhoff et al. | 364/574 |
| 5,471,434 | 11/1995 | Davis et al. | 367/124 |
| 5,528,555 | 6/1996 | Santos et al. | 367/106 |
| 5,537,368 | 7/1996 | O'Brien, Jr. et al. | 367/135 |
| 5,581,490 | 12/1996 | Ferkinhoff et al. | 364/574 |

*Primary Examiner*—Daniel T. Pihulic
*Attorney, Agent, or Firm*—Michael J. McGowan; Michael F. Oglo; Prithvi C. Lall

[57] ABSTRACT

The present invention comprises a method for filling in missing data intervals in a quantized time-dependent data signal that is generated by, e.g., an underwater acoustic sensing device. In accordance with one embodiment of the invention, this quantized time-dependent data signal is analyzed to determine the number and location of any intervals of missing data, i.e., gaps in the time series data signal caused by noise in the sensing equipment or the local environment. The quantized time-dependent data signal is also modified by a low pass filter to remove any undesirable high frequency noise components within the signal. A plurality of mathematical models are then individually tested to derive an optimum regression curve for that model, relative to a selected portion of the signal data immediately preceding each previously identified data gap. The aforesaid selected portion is empirically determined on the basis of a data base of signal values compiled from actual undersea propagated signals received in cases of known target motion scenarios. An optimum regression curve is that regression curve, linear or nonlinear, for which a mathematical convergence of the model is achieved. Convergence of the model is determined by application of a smallest root-mean-square analysis to each of the plurality of models tested. Once a model possessing the smallest root-mean-square value is derived from among the plurality of models tested, that optimum model is then selected, recorded, and stored for use in filling the data gap. This process is then repeated for each subsequent data gap until all of the identified data gaps are filled.

10 Claims, 6 Drawing Sheets

METHOD FOR DATA GAP COMPENSATION

STATEMENT OF GOVERNMENT INTEREST

The invention described herein may be manufactured and used by or for the Government of the United States of America for governmental purposes without the payment of royalties thereon or therefor.

CROSS REFERENCE TO RELATED PATENT APPLICATION

This patent application is co-pending with a related patent application Ser. No. 08/682,896, which is commonly assigned and filed on Jun. 28, 1996, entitled SYSTEM AND METHOD FOR CHAOTIC SIGNAL IDENTIFICATION, (Navy Case No. 74951).

BACKGROUND OF THE INVENTION

(1) Field of the Invention

The present invention generally relates to the field of signal processing, and more particularly to noise discrimination and analysis of discontinuities (missing data) in time series signals.

(2) Description of the Prior Art

It is well known that time series data signals are sometimes corrupted, resulting in missing or unusable data. By way of example, it is often the case that discontinuities (missing data) are observed in the time series signals measured and recorded by underwater acoustic sensing contact, or target tracking devices, such as naval sonar systems, contact localization motion analysis systems, or the like. These discontinuities in the signal may be caused by electrical interference, i.e., noise, that is internally generated by the measuring device itself, or by noise from the environment being observed. This noise often causes a portion, or portions, of the time series signal to be missing or unusable. In any case, information contained in the time series signal often needs to be preprocessed to compensate for such corruptions, before it can be properly analyzed and subsequently used.

Moreover, there is a special need for such compensation preprocessing within the functioning of submarine carried analysis systems for processing passive acoustic contact, or target generated signal values for determination of the presence and nature of chaotic signal components in the signal values. The analysis system disclosed in the above-identified copending application, hereby incorporated by reference in its entirety, is exemplary of such special need. The underlying data to be detected by this system is the presence of a chaotic (and hence nonlinear) component of the signal, such as acoustic energy induced by turbulence associated with underwater vehicle movement, where data sequence measurements are biased by the imperfections of sensory devices. Particular discussion of how the method of this invention would be employed in its functioning is described in a portion of its DESCRIPTION OF THE PREFERRED EMBODIMENT section which provides a detailed description of a data gap compensator (reference number 23, therein) commencing with text "The data gap compensator . . . ", and ending with text " . . . to the processing section 12" and in a portion which summarized the operation of the data gap compensator (23, therein) in conjunction with control module (14, therein) commencing with text "The control module 14 . . . " and ending with text " . . . to the operator step 110."

Employing regression methods for data gap compensation is known. Most of the traditional linear regression methods employ a simple model with a moderate model (quadratic, cubic, or at most, fourth-order). It has been widely publicized in the open literature that the performance of projecting missing data via traditional techniques is not optimized. In many real-world applications of data gap compensation with traditional methods there exists many shortfalls such as errors between true and projected curves. One technology area where these problems exist is the processing of noise corrupted time measurements where the underlying data or measurements which are to be processed are nonlinear in nature, corrupted by non-white noise, and biased by the imperfections of sensory devices.

As a consequence, there has been a long felt need for a method of filling data gaps in time series data signals that are generated by such underwater acoustic sensing or contact tracking devices.

SUMMARY OF THE INVENTION

It is, therefore, an object of the invention to provide a method for filling in at least one missing interval of data within quantized time-dependent data signals with all the aforementioned needs substantially met.

Another object of the invention is the provision of a method for compensating for the discontinuity caused by missing intervals of data within a quantized time-dependent data signal, and which is of special utility in the performance of such functions in a submarine carried analysis system for processing passive undersea acoustic contact, or target transmitted signals for determination of the presence and the nature of chaotic signal components.

Still another object of the invention is the provision of such a method of data gap compensation which is of special utility in processing noise corrupted time measurements where the underlying data or measurements are non-linear in nature, corrupted by non-white noise, and biased by the imperfections of sensory devices.

Yet another object of the invention is the provision of such a method of data gap compensation which as one of its performance features includes inherent flexibility of mode of operation to select the appropriate gap spanning parametric equation for a curve both as to selection of a specific curve and to curve fitting.

Yet another object of the invention is the provision of a method for filling in at least one missing interval of data within a quantized time-dependent data signal that enhances the continuity of that data signal's structure, thereby reducing statistical biases in subsequent signal processing.

Yet another object of the invention is to provide a method for filling in at least one missing interval of data within a quantized time-dependent data signal that is easily adapted for implementation with either standard electronic components or via software means.

With the above and other objects in view, as will hereinafter appear, a feature of the present invention is the provision of a novel recursive projection regression method for filling in at least one missing interval of data within a quantized time-dependent signal. One preferred embodiment of the present method employed in the processing of acoustic passive undersea warfare contact, or target transmitted signals comprises the following steps:

(1) providing means for measuring a quantized time-dependent signal;

(2) filtering that quantized time-dependent signal to remove all high frequency components above a certain threshold frequency;

(3) providing means for retrievably storing data representing the filtered quantized time-dependent signal wherein that data comprises a time-series of data points;

(4) retrieving the time-series of data points from the storage means;

(5) determining the number of missing intervals within the time-series of data points;

(6) forming a data window comprising at least a selected portion of the time-series of data points immediately preceding a first missing data interval empirically determined from a data base of actual signal values gathered in sea tests involving contact localization motion analysis scenarios between a sensor carrying submarine and a contact submarine generating a passive acoustic signal in environments of various levels of acoustic propagation noises;

(7) fitting a first order regression curve to that portion of the time-series of data points within the window;

(8) fitting a second order regression curve to the same portion of the time-series of data points within the same window;

(9) computing a plurality of residual values for the first and the second regression curves;

(10) computing a root-mean-square value for the plurality of residual values for the first order regression curve and for the plurality of residual values for the second order regression curve;

(11) determining the smallest root-mean-square value for the plurality of residual values for the first order regression curve and for the plurality of residual values for the second order regression curve;

(12) comparing the smallest root-mean-square values of the first order and the second order regression curves;

(13) selecting a regression curve that provides the smallest root-mean-square values; and

(14) storing and recording the selected regression curve as synthesized values for compensation of the discontinuity caused by an interval or intervals of missing data.

BRIEF DESCRIPTION OF THE DRAWINGS

Reference is made to the accompanying drawings in which are shown illustrated embodiments of the invention, from which its novel features and advantages will be apparent.

In the drawings.

DETAILED DESCRIPTION OF THE PREFERRED EMBODIMENT

Figure 1:
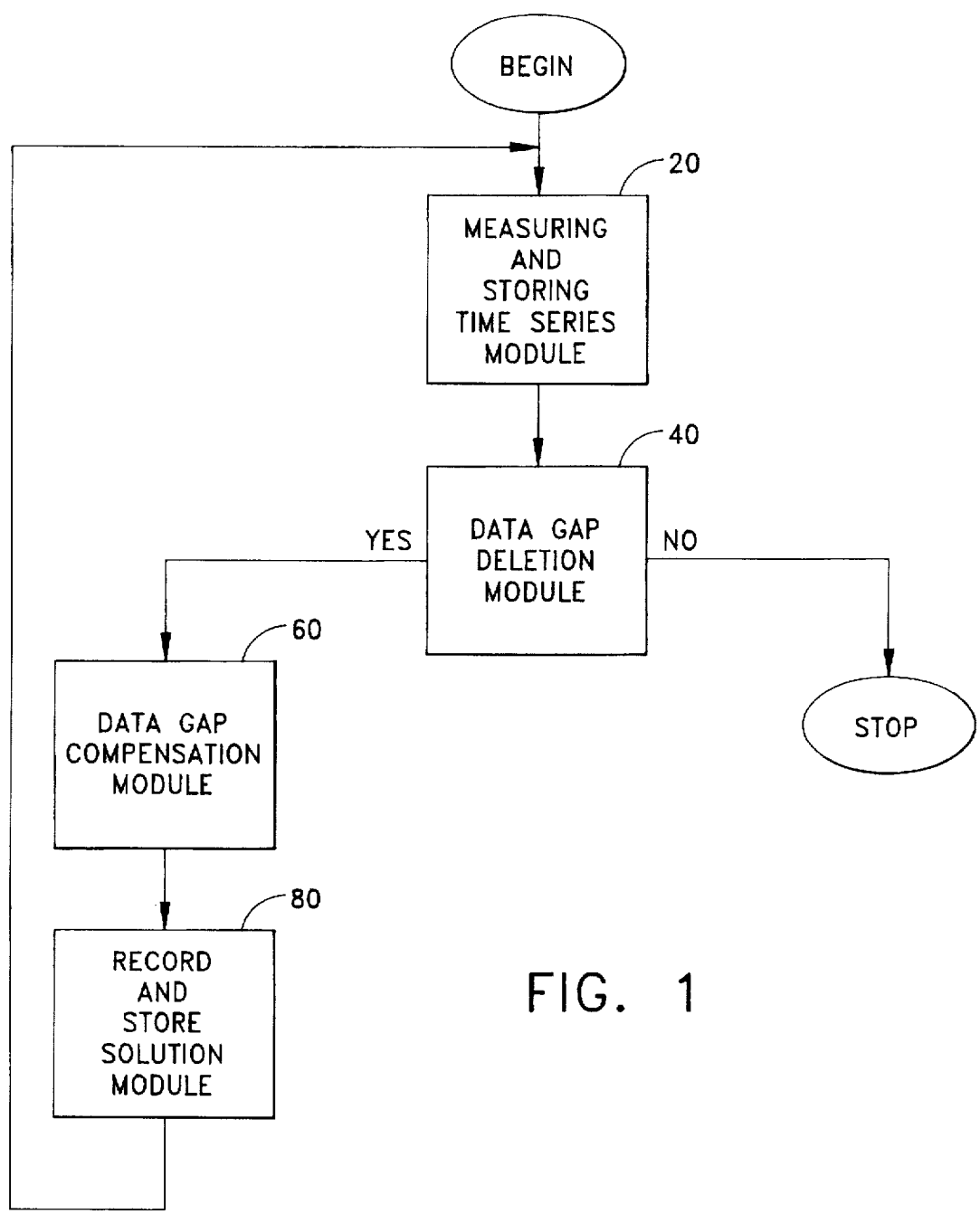
FIG. 1 is a general block chart describing the recursive projection regression method of the present invention.
Figure 2:
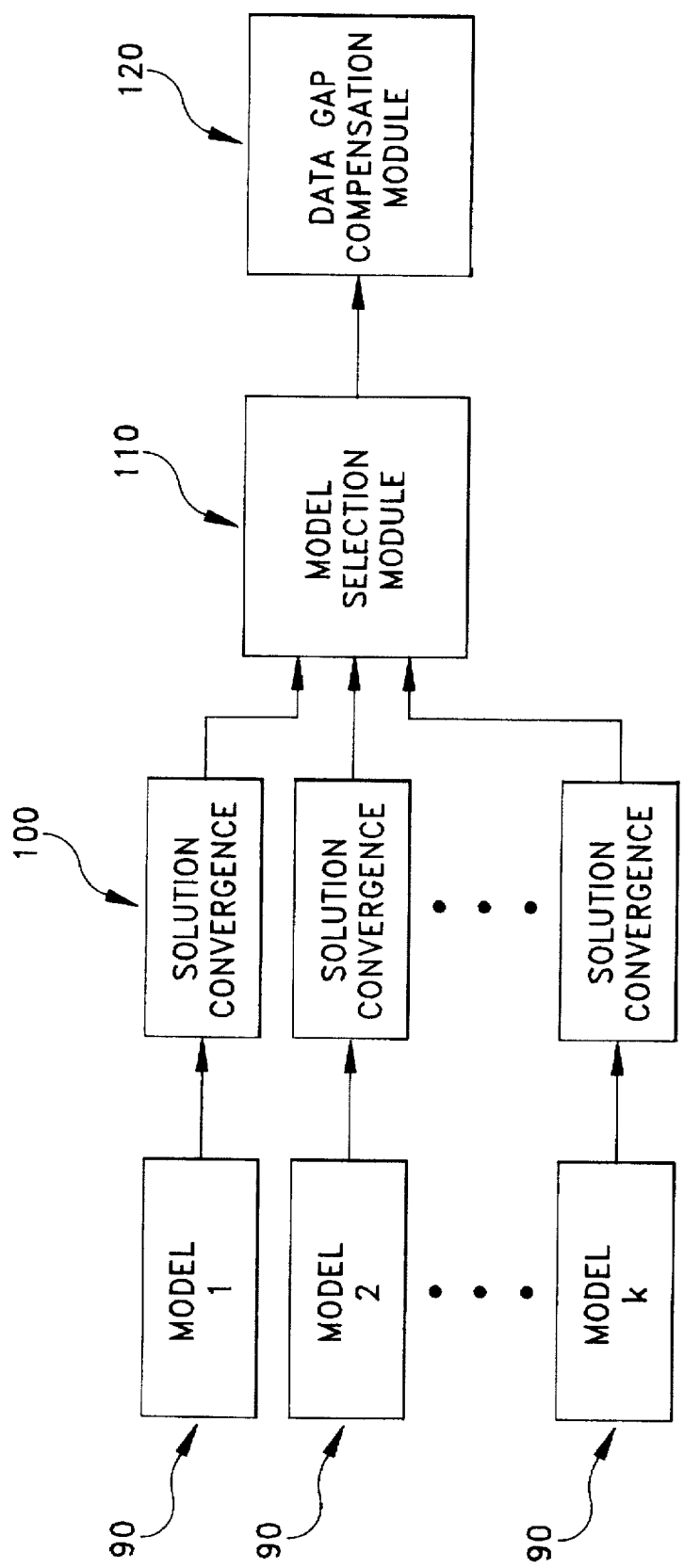
FIG. 2 is a simple block diagram illustrating model selection.

Referring first to FIGS. 1 and 2, block diagrams are provided that generally summarize the recursive projection regression method of the present invention. The method of the present invention generally comprises a module which measures and stores a quantized time-dependent data signal, such as is provided by an underwater acoustic sensing device. For example, naval sonar systems or contact localization motion analysis units associated with sonars (not shown) often produce quantized time-dependent data relating to the observation and tracking of various objects located on or below the surface of a body of water. This quantized time-dependent data signal is then passed to the present invention, which generally comprises a measuring and storing module 20, a data gap deletion module 40, a data gap compensation module 60, and a record and store solution module 80, where it is analyzed to determine the number and location of any intervals of missing data, i.e., gaps in the time series data signal caused by noise in the sensing equipment or the local environment, and so as to fill-in any of the intervals of missing data that are detected. The quantized time-dependent data signal may also be modified by a low pass filter of a type well known in the art (FIGS. 3 and 4), to remove any undesirable high frequency noise components within the signal.

Data gap compensation module 60 provides a plurality of mathematical models (shown generally at 90 in FIG. 2) that are individually tested to derive an optimum regression curve for that model, relative to a portion of the signal data immediately preceding each previously identified data gap. It will be understood that an optimum regression curve, in the context of the present invention, is that regression curve for which a mathematical convergence of the model is achieved (shown generally at 100 in FIG. 2). In a preferred embodiment, "convergence" of the model is determined by application of a smallest root-mean-square analysis to each of the plurality of models tested. Once a model possessing the smallest root-mean-square value is derived from among the plurality of models tested, that optimum model is then selected (shown generally at 110 in FIG. 2), recorded, and stored via record and store solution module 80 (see FIG. 1) module, for use in filling the data gap (shown generally at 120 in FIG. 2). This process is then repeated for each subsequent data gap until all of the identified data gaps are filled.

In connection with the present invention, various mathematical models may be used to derive an appropriate regression curve for fitting to the quantized time-dependent data signal. In one preferred embodiment, a class of generalized "Maximum Likelihood Estimation" (MLE) functions are employed. It will be understood that MLE functions of this type have been found to be useful in modeling data structures that conform to a statistical linear model, and are well known to those skilled in the art. Details of this type of "general linear model" may be found in *Introduction to Statistical Theory* by P. G. Hoel, et al., Boston, Houghton Mifflin Company, 1971, and more particularly to its chapter 4 (Linear Models—Estimation), pages 112–133, and its chapter 5 (Linear Models—Test), pages 140–157, which text portions are hereby incorporated herein by reference.

In this embodiment of the present invention, a "general linear regression model" is preferably derived from a multivariate generalized jointly distributed MLE function, such as:

$$E(Y_i) = \beta_1 X_{1i} + \beta_2 X_{2i} + \ldots + \beta_k X_{ki} \tag{1}$$

In the above-described general MLE function, each $\beta_k$ is a weighted parameter associated with the n sample $x_k$ observations to be estimated. A constant term, $\beta_o$, is also included in this general relationship. The term $\beta_o$ is typically determined by setting $x_{ki}=1$. Estimation of these parameters for both linear models and nonlinear models is carried out with conventional analytical procedures that are well known to those skilled in the art.

The above-described general MLE function may be employed in the present invention to represent a general linear regression model of Y on x. More particularly, the recursive projection regression method of the present invention derives a set of special models from this general model, by selecting specific functional forms of $E(Y_i)$. In this way, the constructed function (i.e., the regression curve representing the locus of conditional means over the domain of the x values) may be utilized to compensate for the gap of missing data within the time-series data signal, with the smallest possible error (least bias).

Two specific linear models have been found to yield excellent results when used in connection with one preferred embodiment of the present invention. More particularly, a polynomial model and a trigonometric (Fourier type) model have been found to provide regression curves exhibiting excellent fit to the quantized time-dependent data signals generated by underwater acoustic sensing devices or contact localization motion analysis units of the type used in connection with naval sonar systems. For example, a general polynomial form of the above-described general MLE function can be derived by setting each $x_{ki}$ equal to $t^{k-1}$ and omitting the observation index i, as follows:

$$E(Y_j)=\beta_0+\beta_1 t+\beta_2 t^2+\beta_3 t^3 \ldots +\beta_r t^r, \text{ where } t=1,2,3,\ldots,n. \quad (2)$$

It will be understood that "t" represents the discrete time observations measured by measuring means typically employed in conjunction with a naval sonar system or the like.

Figure 3:
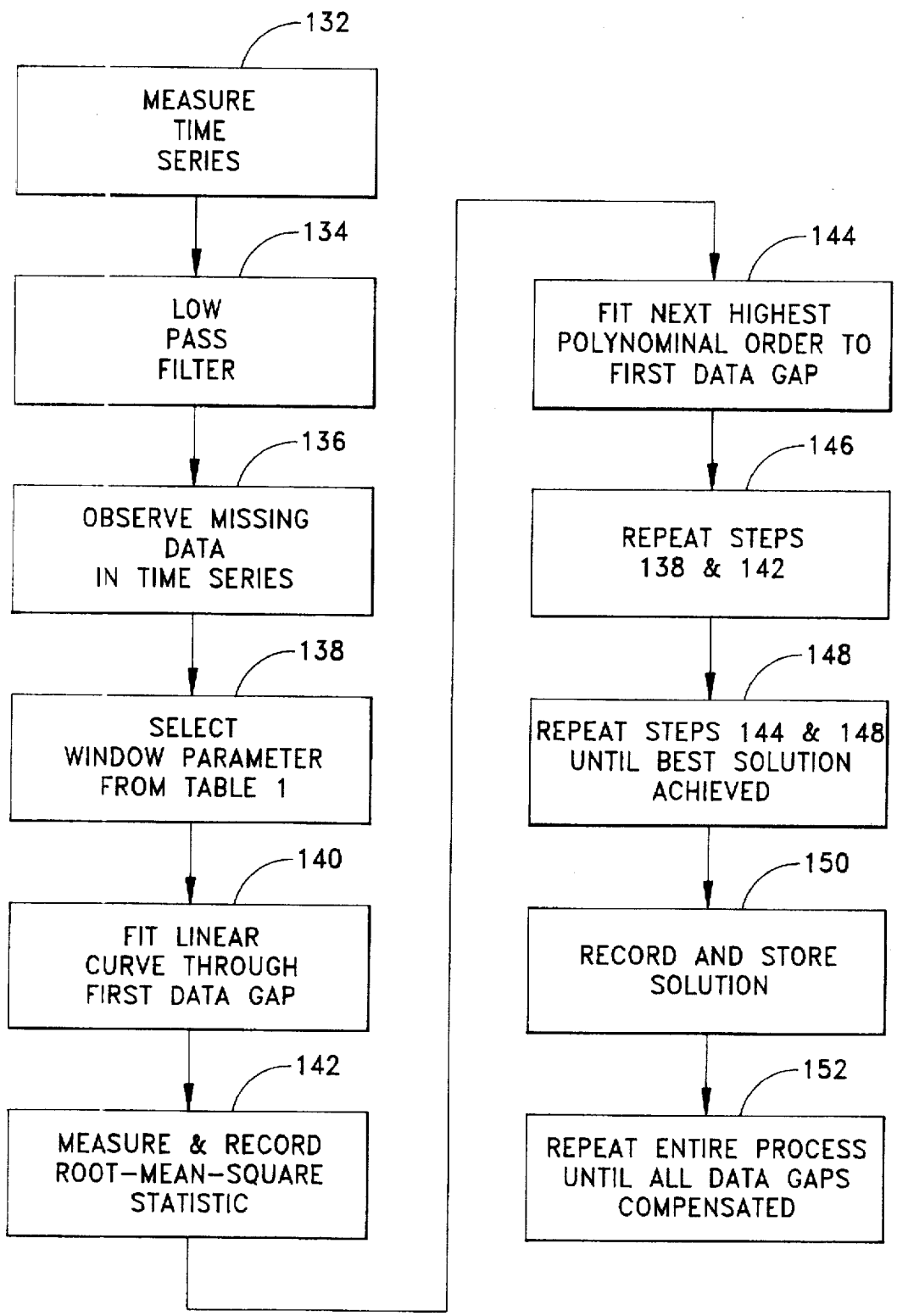
FIG. 3 is a flow chart of the steps associated with a polynomial model fit according to the present invention.
Figure 4:
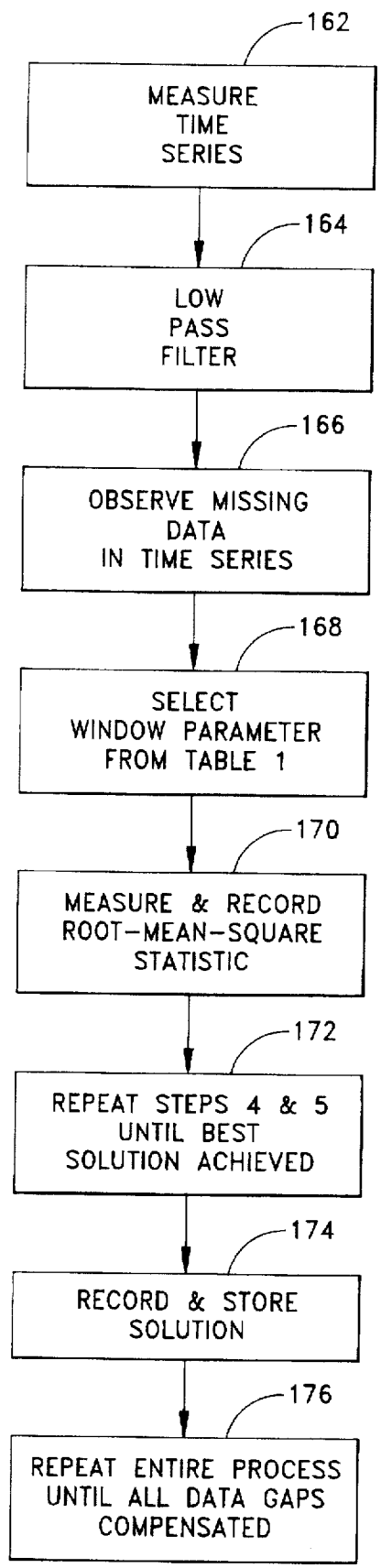
FIG. 4 is a flow chart of the steps associated with a Discrete Fourier Transform model fit according to the present invention.

The steps comprising the polynomial fit method of the present invention are disclosed in the flow chart shown in FIG. 3. More particularly, the application of a polynomial model will be understood to be a step-wise procedure comprising the steps of: measuring the time series (indicated at 132); low pass filtering (indicated at 134); observing missing data in the time series (indicated at 136); selecting a window parameter from table 1 (indicated at 138); fitting a linear curve through the first data gap (indicated at 140); measuring and recording a root-mean-square statistic (indicated at 142); fitting the next highest polynomial order to the first data gap (indicated at 144); repeating steps 138 and 142 (indicated at 146); repeating steps 144 and 146 (indicated at 148); recording and storing the solution (indicated at 150); and repeating the entire process until all data gaps are compensated (indicated at 152). It will be appreciated that a linear fit is first made (step 140) to the data signal of interest. Then, successively higher orders are introduced until the first non-missing data points immediately following a data gap, and the corresponding model projected point or points, achieve a convergent minimum difference (step 146). Solution convergence for the polynomial model is based on the determination of a smallest root-mean-square value from among a plurality of successive models, of increasing order, that are fit to the data signal (step 148).

It will be understood that, occasionally, a data signal may contain certain periodicities which may not be well modeled by polynomial or other regression curves. To the end of providing a solution in these cases, the recursive projection regression method of the present invention includes provision of a regression curve that is derived from a partial sum of a Discrete Fourier series by applying a Discrete Fourier Transform (DFT) to the data signal. As will be appreciated by those skilled in the art, a DFT may be derived from the above-disclosed general MLE function by setting k=2r+1, x1=1, $x_k$=cos(j−1)t for j=2,....,r+1; and $x_j$=sin(j−4−1)t for j=r+2,...., 2r+1, as follows:

$$E(Y_i)=a_0+a_1 \cos t+a_2 \cos 2t+\ldots +a_r \cos rt+b_1 \sin t+b_2 \sin 2t+\ldots +b_r \sin rt \quad (3)$$

As with a polynomial model, for the DFT, the solution to the problem of data gap compensation for the set of points in the (t,y) plane is obtained by simultaneously solving a derived system of normal equations. The details of this type of solution technique parallel those disclosed hereinabove in connection with the polynomial fit model. More particularly, and turning now to FIG. 4, the DFT technique of the present invention comprises the steps of: measuring the time series (indicated at 162); low pass filtering (indicated at 164); observing missing data in the time series (indicated at 166); selecting a window parameter from table 1 (indicated at 168); measuring and recording a root-mean-square statistic (indicated at 170); repeating steps 168 and 170 until a best solution is achieved (indicated at 172); recording and storing the best solution (indicated at 174); and repeating steps 162 to 174 until all the data gaps are compensated (indicated at 176). It will be appreciated that a Discrete Fourier Transform (DFT) is performed adaptively to predict the post-gap data points required to achieve a convergent value (steps 168–176). The method of the present invention selects the smallest of a plurality of smallest root-mean-square values derived for each model (step 172). More particularly, the model that demonstrates an overall minimum root-mean-square value is selected as the best model for compensating for the missing data values. This best model is then recorded and stored. As before, solution convergence is based on a root-mean-square analysis.

Finally, the plurality of models (polynomial, DFT, and others as applicable) are compared to decide which model provides the overall best fit to the existing data and data gaps. More particularly, the model providing the smallest bias, i.e., the smallest difference between the first non-missing data point or points immediately following a data gap and the corresponding model projected point or points, to achieve a convergent minimum difference based on the root-mean-square analysis. The selected model is then employed to compensate for the data gap. It will, of course, be understood that other linear and/or nonlinear regression models may be used, with equal effect, in deriving an optimum fit.

It will be appreciated that with each of the foregoing models, a portion of the data immediately preceding each data gap, is selected as a "data window". More particularly, a data window is selected that has a size "w" corresponding to a preselected number of data points from that portion of the data signal immediately preceding each data gap. The number of data points that determine the size of the data window, "w", is selected according to the level of noise present in the data signal. The resultant synthesized values are provided to a utilization means, such as the processing section (indicated at reference numeral 12 therein) of the analysis system for processing undersea submarine warfare acoustic signals for determination of presence and nature of chaotic signal components, disclosed in the above-identified copending application.

In one embodiment of the present invention, a historical data base of passive acoustic target signal values (obtained from typical target motion situations) are utilized to empirically determine three distinct data window intervals for high, moderate and low signal-to-noise levels, respectively. Table 1 lists the preferred number of data points in a particular data window as a function of the data gap size and the background noise levels present in the data signal.

TABLE I

| Noise Level*** | Window Size Parameter Values Gap Interval | | |
|---|---|---|---|
| | Short (≤2 points) | Moderate (3–10 points) | Long (>10 points) |
| High | 7 m+ | 10–12 m** | all* |
| Moderate | 4–6 m | 7–9 m | all |
| Low | 1–3 m | 3–6 m | all |

*Total data streams adjacent to a gap, including possibly entire history
**m is number of missing data points in a representative gap based on the U.S. Navy's standard rate of gathering data stream sample points, namely a sample rate of three (3) acoustic samples per minute.
***Based on typical contact localization motion analysis noise levels.

EXAMPLE

Figure 5:
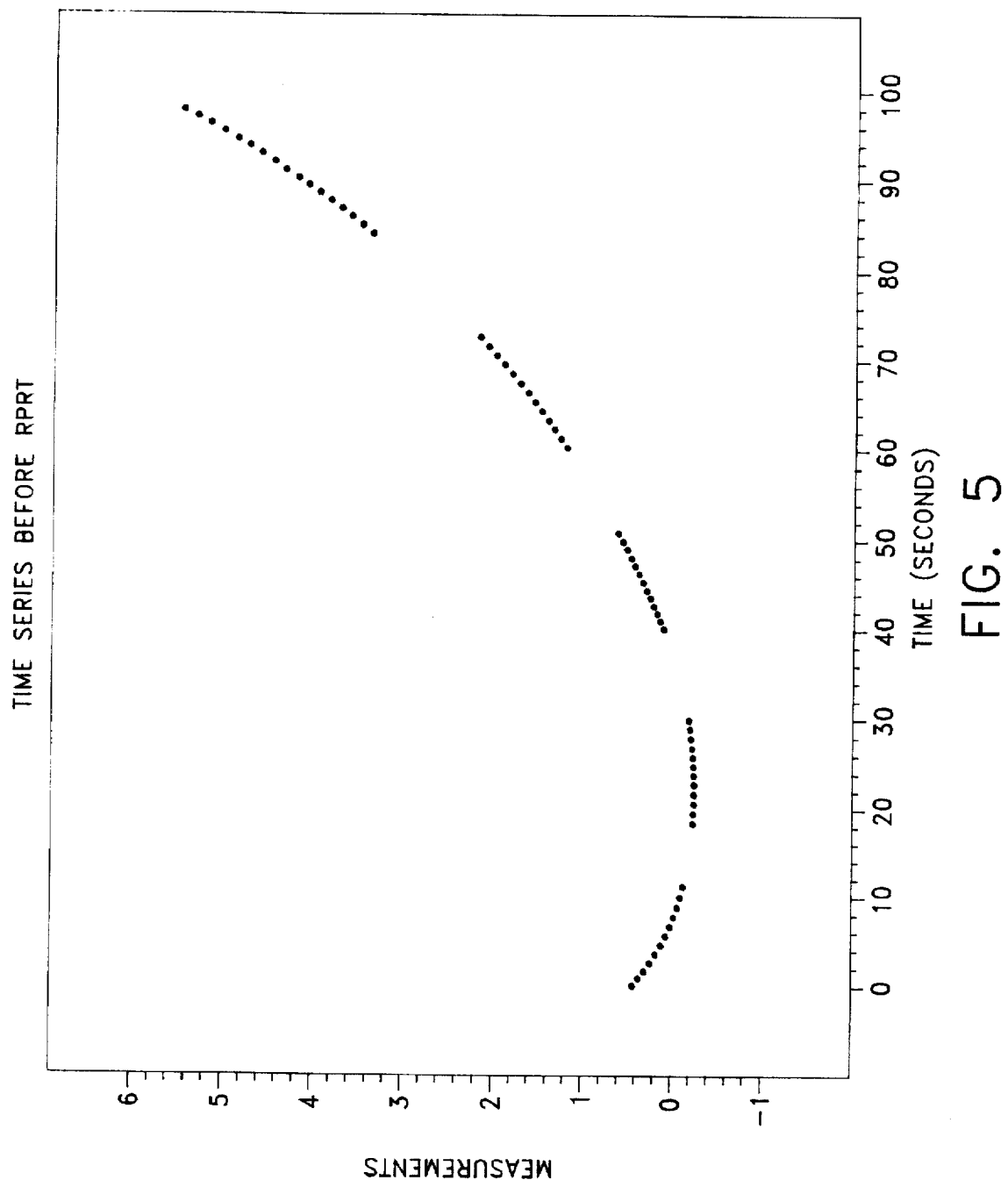
FIG. 5 is a graph of a quantized time-dependent data signal having a plurality of missing intervals of data.
Figure 6:
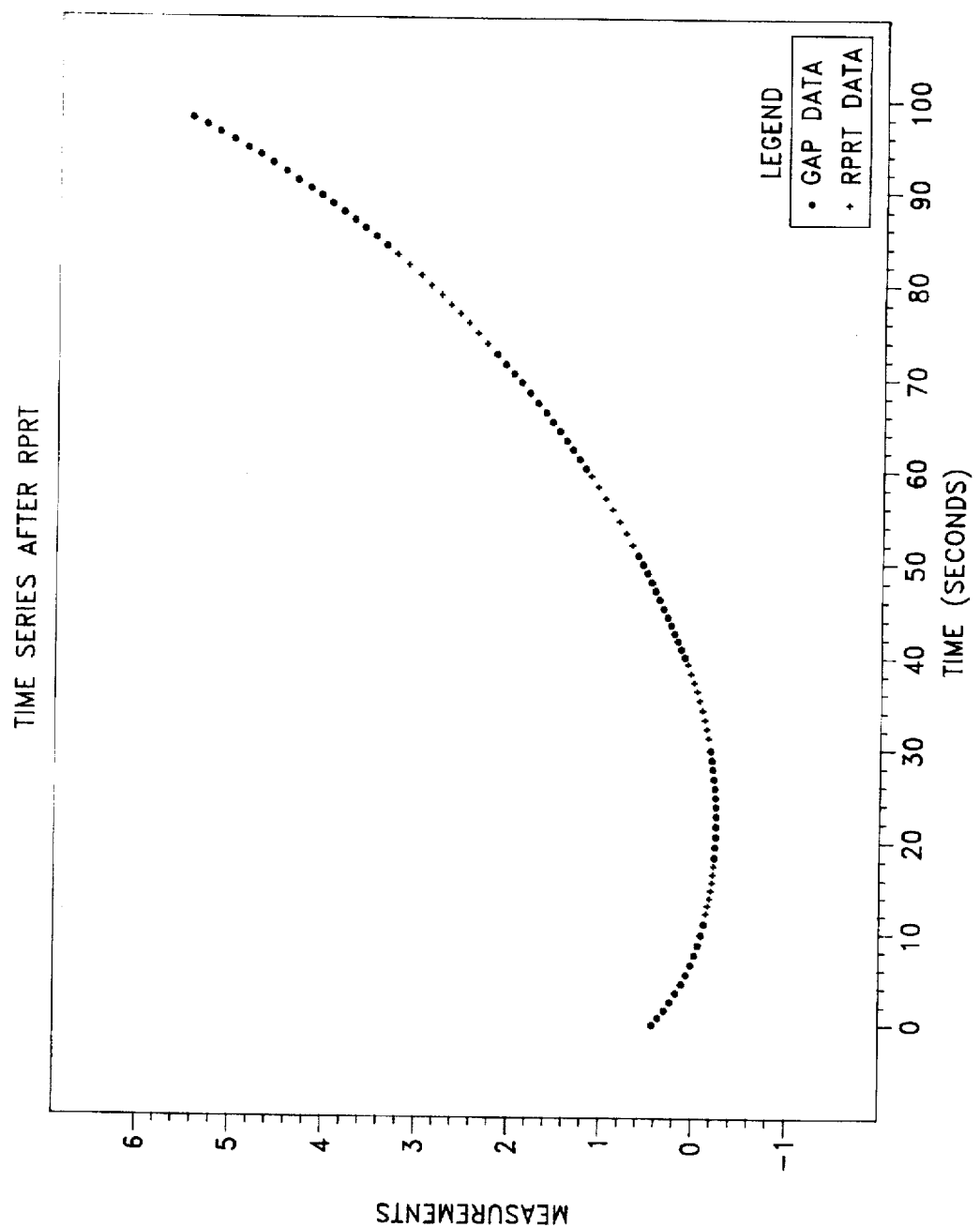
FIG. 6 is a graph similar to that shown in FIG. 5, with the missing intervals of data filled by the method of the present invention.

By way of an example, the polynomial model may be applied to a hypothetical data signal as shown in FIGS. 5 and 6. In application of the polynomial model presented hereinabove, a data gap is filled by projecting an rth order polynomial regression fit across the data gap. FIG. 3 summarizes the method steps of the polynomial fit approach.

The polynomial fit approach is exemplified for the hypothetical time series shown in FIG. 5. This graph represents a time series record for up to 101 measurements taken at one second intervals (one measurement per second). The first measurement is at time 0 ($t_0$) and the last is at time 100 ($t_{100}$). Also seen in FIG. 5 are four "data gaps" (i.e., time intervals during which measurements were expected but, for one or more reasons, were not recorded for data processing). For example, the first data gap begins immediately following the 11th measurement and extends over the interval $t_{12}$ to $t_{19}$. Three other data gaps may also be observed in FIG. 5.

The polynomial fit algorithm begins with the entire time series that has been stored in arrays. Then, the method steps in the polynomial fit algorithm for a measured time series with missing data are as follows:
For the first data gap in the data signal.

A window is first formed with an operator specified size w (entered by the operator, and based on the guidelines disclosed in Table 1). If the operator specifies a window size that is too large, it is reduced to within the number of data points preceding the data gap under consideration. Next, within this window a linear regression curve is fit. Then, within that same window a quadratic regression curve is fit. A set of residual values are determined for the linear and quadratic regression fits. These residual values are then compared with one another. A selection is made, by selection means, based on the order of fit that provides the smallest root-mean-square value. The model that provides this smallest root-mean-square value is then recorded and stored.

Next, the order of the regression fit is increased to cubic order, and a set of residual values are determined for the cubic order regression fit. These residual values are then compared with the residual values for the model that provided the smallest root-mean-square value for the linear and quadratic regression fit. One model is then selected that gives the smallest root-mean-square value overall from among the models tested. This model is then recorded and stored. This procedure is continued as disclosed hereinabove for ever higher orders until reduction in the root-mean-square value becomes negligible. The order that provides the smallest root-mean-square value overall is then selected, stored, and recorded as a final solution fit. The entire procedure is then applied to each data gap until a regression curve is fit for each gap.

The above example summarizes the method of the present invention as it may be applied to the four data gaps shown in FIG. 5. FIG. 6 shows the results of the recursive projection regression method applied to the four data gaps shown in FIG. 5. It should be noted that in the above example, the quadratic polynomial regression curve was found to be the optimum fit with which to data-fill the missing measurements comprising the first data gap. FIG. 6 shows the first gap that was filled in by projecting a solution across the interval $t_{12}$ to $t_{19}$. Similarly, in FIG. 6, the projected optimum solution is displayed for the second data gap which was based on a third-order (cubic) fit. Following the above steps of the procedure, the remaining data gaps were filled.

The present method is by no means limited to models herein disclosed, as the method may be employed advantageously for various other, more specialized models. Some examples of such specialized models are discussed in the earlier cited textbook by P. G. Hoel et al.

Additionally, specific statistical criteria may be applied, at certain decision nodes within the steps of the method of the present invention, without departing from its scope. For example, the linear regression models may be accompanied by a statistical hypothesis test in deciding the degree of sufficient fit. Also, although a preferred embodiment of the recursive projection regression method is based primarily on a general linear model other, nonlinear, models are to be assumed within the domain of the claims set forth hereinbelow. Some indication of the meaning and utility of nonlinear models is provided in the above cited textbook by P. G. Hoel, et al.

Furthermore, the present invention may be utilized as a portion of software means for use in flexibly programming a general purpose computer of the sort used in connection with naval sonar systems or the like. Such software means will become obvious to those having ordinary skill in the art upon review of the method of the present invention as disclosed in the herein appended claims. Likewise, the method of the present invention may also be implemented on one or a combination of electronic component means, as a portion of a dedicated hardware system associated with a naval sonar or target motion analysis sensor system. Such electronic component means may, for example, comprise one or a series of dedicated integrated circuits, wide-band transistors and function modules. The function of each circuit, transistor or module is fully described by literature supplied by the manufacturers of these types of components, and the manner in which such a circuit would operate would become obvious to those having ordinary skill in the art of electronics upon review of the method of the present invention, as disclosed herein by the appended claims.

The advantages of the invention will be readily appreciated.

Currently time series discontinuities in naval sonar systems are not compensated. The present invention constitutes a novel method for compensating such data record gaps, thereby enhancing the integrity of the signal structure, and resulting in a reduction of statistical biases in subsequent target motion analysis signal processing.

Another advantage of the present invention is the provision of a method for filling in at least one missing interval of data within a quantized time-dependent data signal that enhances the continuity of that data signal's structure, thereby reducing statistical biases in subsequent signal processing.

A further advantage of the invention is the provision of a method for filling in at least one missing interval of data within a quantized time-dependent data signal that is easily adapted for implementation with standard electronic components or via software means.

A still further advantage of the invention is the provision of synthesized data to compensate for discontinuities in input data in connection with the operation of submarine carried analysis systems for processing passive undersea acoustic contact, or target, transmitted signals for determination of presence and nature of chaotic signal components.

It is also to be understood that the present invention is no means limited to the particular constructions herein disclosed and shown in the drawings, but also comprises any modifications or equivalents within the scope of the claims.

What is claimed is:

1. A method for processing a time series of quantized passive acoustic target transmitted signal values so as to compensate for missing intervals of data within said time series, said method comprising the following steps:

a first step of determining empirically at least three data window intervals corresponding respectively to high, moderate and low signal-to-noise levels within said quantized passive acoustic target transmitted signal values wherein said data window intervals provide a basis for the desired degree of fit of a regressively derived curve of substitute data;

a second step of low pass filtering said quantized passive acoustic target transmitted signal values to eliminate undesirable transitory signals;

a third step of detecting sequentially with respect to said quantized passive acoustic target transmitted signal values the number of missing intervals of data;

a fourth step of determining an initial reference curve of point values spanning a first interval of missing data adjacent to a first selected data window based on at least one of said window intervals for a desirable signal-to-noise-ratio; and a fifth step of regressively deriving from said initial reference curve a convergent solution curve yielding the aforesaid desired degree of fit of substitute data.

2. A method according to claim 1 further comprising the initial step of providing a historical data base comprising empirically based passive acoustic target transmitted signal values recorded from actual target motion situations.

3. A method according to claim 2 wherein said empirically based passive acoustic target transmitted signal values are derived from a data base of actual signal values gathered in sea tests involving contact localization motion analysis scenarios between a sensor carrying submarine and a contact submarine wherein said contact submarine is generating a passive acoustic signal in environments of various levels of acoustic propagation noises.

4. A method according to claim 3 wherein said at least three data window intervals correspond to a preselected number of data points from a portion of said time series of quantized passive acoustic target transmitted signal values immediately preceding each data gap.

5. A method according to claim 4 wherein said preselected number of data points is based upon a rate of sampling of said time series of quantized passive acoustic target transmitted signal values of three samples per period and a total range of gap intervals for gaps from 2 data points to 10 data points of one through twelve.

6. A method according to claim 1 wherein said initial reference curve of point values comprises a polynomial function derived from a general equation of the form $E(Yj) = \Sigma \beta r tr$.

7. A method according to claim 1 wherein said initial reference curve of point values comprises a partial sum of a Discrete Fourier series by applying a Discrete Fourier Transform (DFT) to said time series of quantized passive acoustic target transmitted signal values, said DFT comprising the form $E(Yj) = \Sigma a \cos rt + b r \sin rt$.

8. A method according to claim 7 wherein from said DFT derived initial reference curve a convergent solution DFT regression curve is derived yielding a desired degree of fit of substitute data.

9. A method according to claim 1 comprising an initial step of providing a historical data base comprising empirically based passive acoustic target transmitted signal values recorded from actual target motion situations, and further comprising the following steps:

a sixth step of modeling an additional reference curve derived from a partial sum of a Discrete Fourier series by applying a Discrete Fourier Transform (DFT) to said time series of quantized passive acoustic target transmitted signal values, said DFT comprising the form $E(Yj) = \Sigma a \cos rt + b r \sin rt$ wherein said DFT derived reference curve spans the same window interval as said initial reference curve;

a seventh step of regressively iteratively deriving from said DFT derived reference curve a convergent solution DFT derived reference curve yielding said desired degree of fit of substitute data;

an eighth step of recording said time series of quantized passive acoustic target transmitted signal values of said regressively derived convergent solution DFT derived reference curve over said same window interval; and a ninth step of choosing, as between said regressively derived convergent solution initial reference curve and said regressively derived convergent solution DFT derived regression curve the one curve which most closely provides a fit of substitute data to said time series of quantized passive acoustic target transmitted signal values over said same window interval.

10. A method for processing a time series of quantized passive acoustic target transmitted signal values so as to compensate for missing intervals of data within said time series wherein said method is adapted for implementation on a flexibly programmed computer, said method comprising the following steps:

a first step of determining empirically at least three data window intervals corresponding respectively to high, moderate and low signal-to-noise levels within said quantized passive acoustic target transmitted signal values wherein said data window intervals provide a basis for the desired degree of fit of a regressively derived curve of substitute data;

a second step of low pass filtering said quantized passive acoustic target transmitted signal values to eliminate undesirable transitory signals;

a third step of detecting sequentially with respect to said quantized passive acoustic target transmitted signal values the number of missing intervals of data;

a fourth step of determining an initial reference curve of point values spanning a first interval of missing data adjacent to a first selected data window based on at least one of said window intervals for a desirable signal-to-noise-ratio; and a fifth step of regressively deriving from said initial reference curve a convergent solution curve yielding the aforesaid desired degree of fit of substitute data.

* * * * *